Feb. 24, 1953  W. H. SMITH  2,629,590
COLLATING MACHINE
Filed Feb. 2, 1949  17 Sheets-Sheet 1
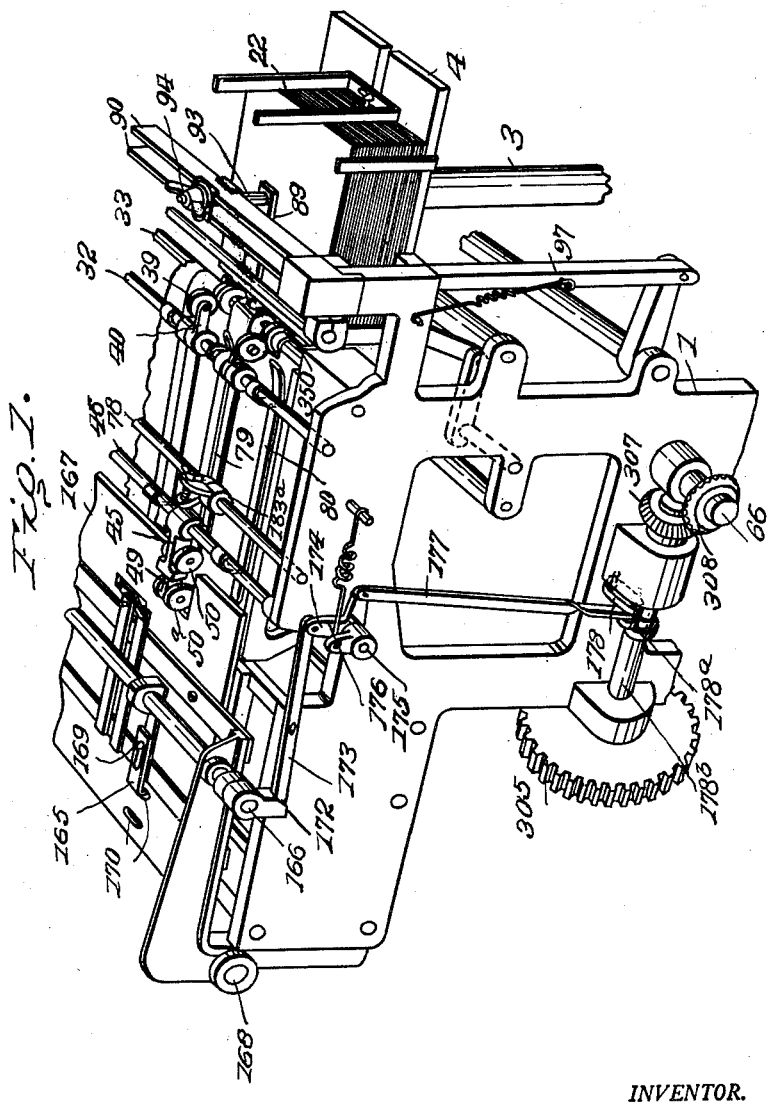
INVENTOR.
Walter H. Smith
BY
Atty.

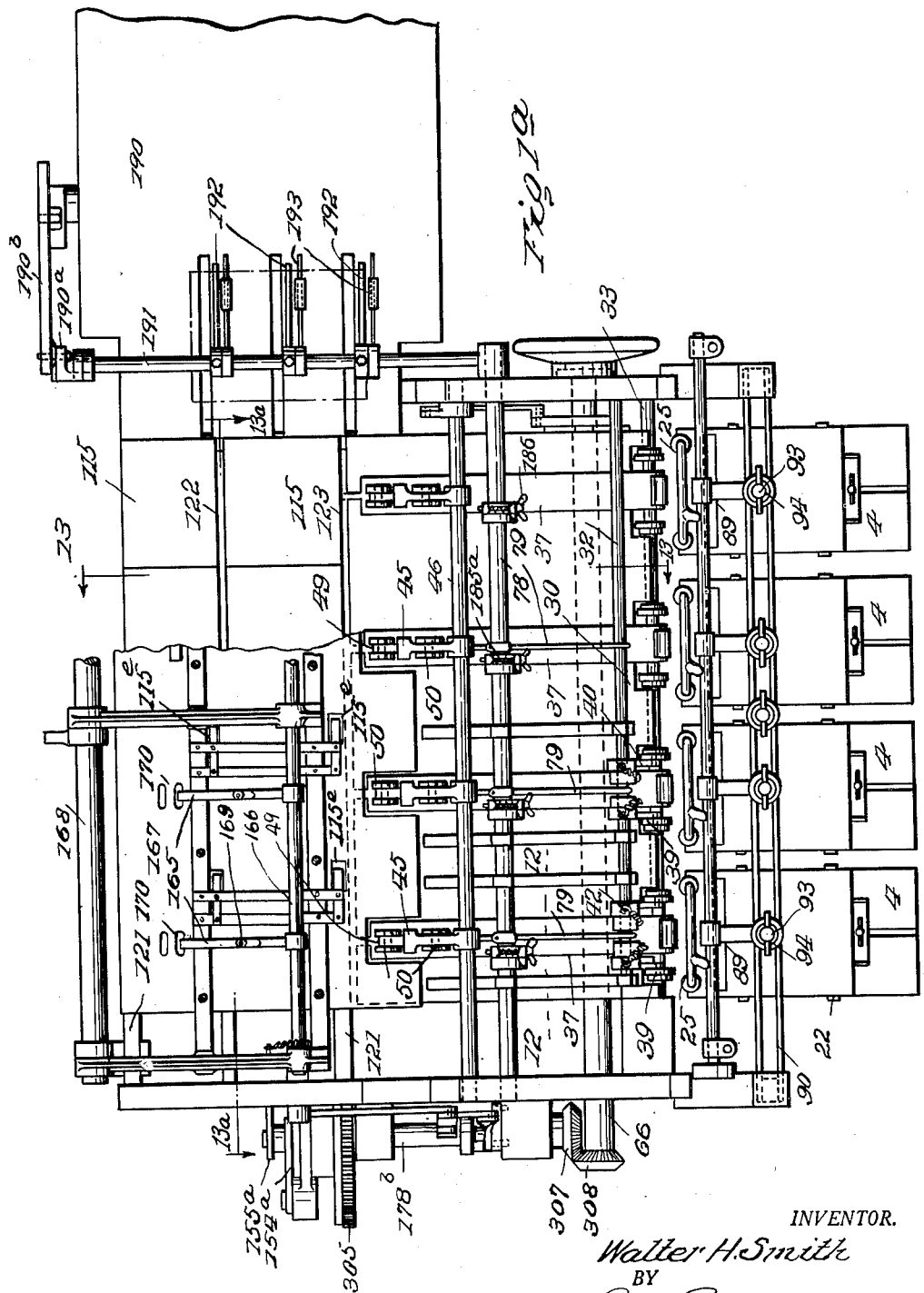

Feb. 24, 1953   W. H. SMITH   2,629,590
COLLATING MACHINE
Filed Feb. 2, 1949   17 Sheets-Sheet 3
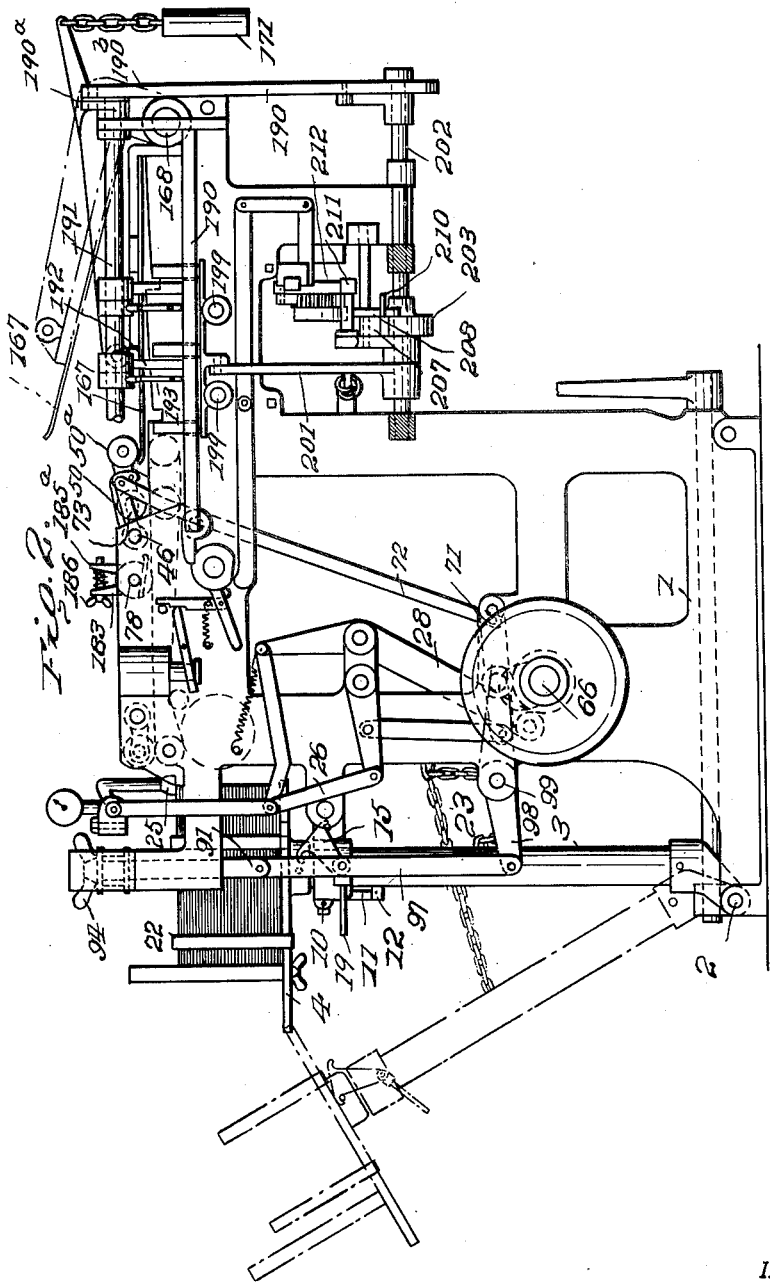
INVENTOR.
Walter H. Smith
BY
Atty.

Feb. 24, 1953 W. H. SMITH 2,629,590
COLLATING MACHINE
Filed Feb. 2, 1949 17 Sheets-Sheet 4
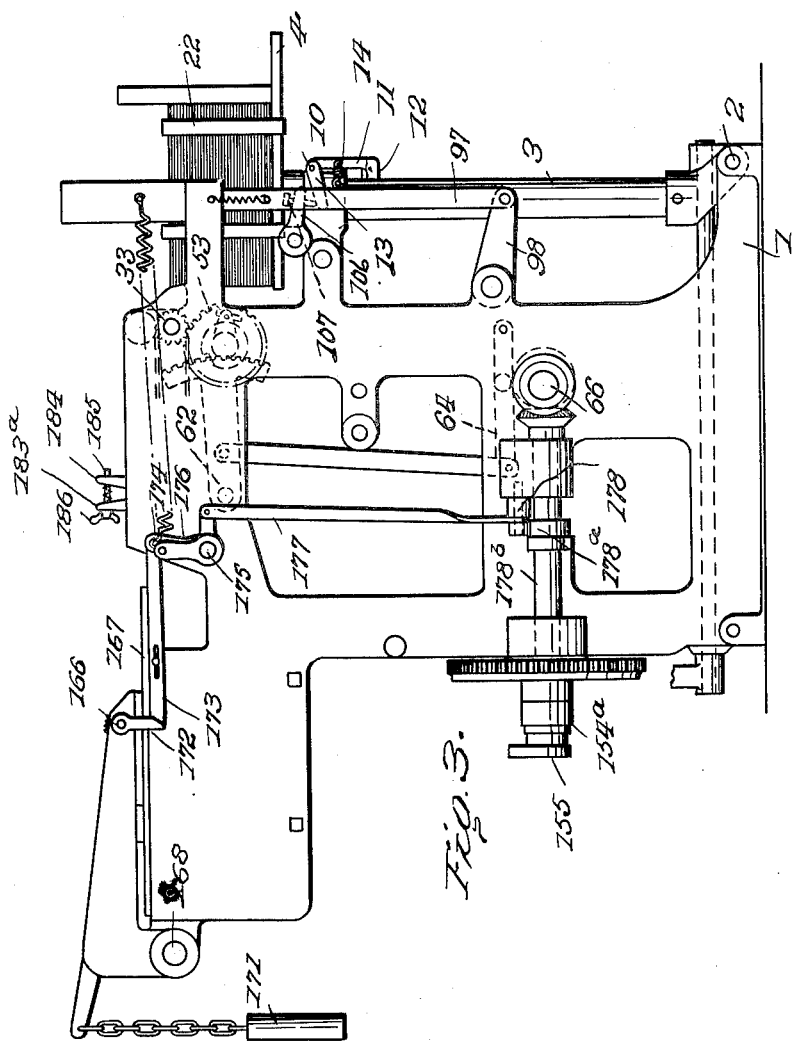
INVENTOR.
Walter H. Smith
BY
Atty.

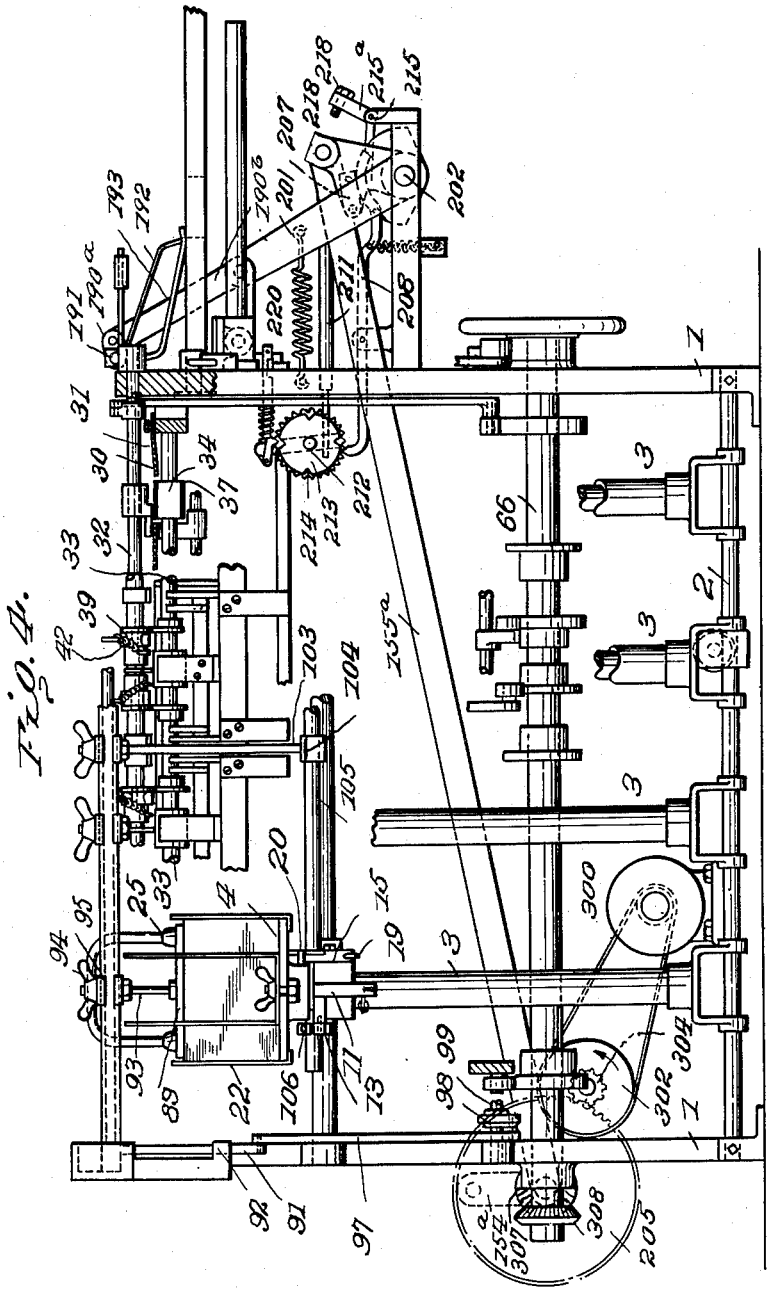

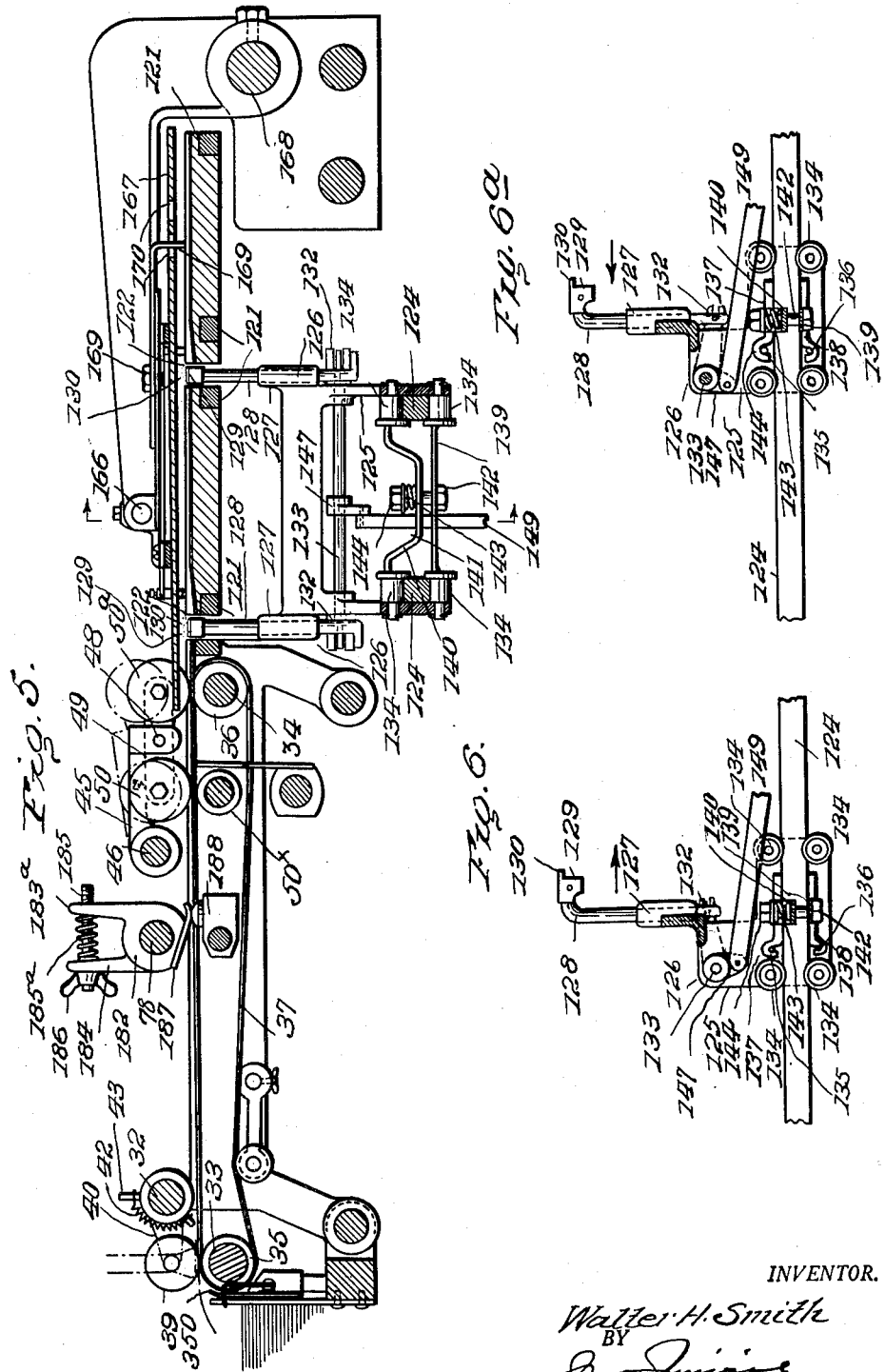

Feb. 24, 1953  W. H. SMITH  2,629,590
COLLATING MACHINE
Filed Feb. 2, 1949  17 Sheets-Sheet 7
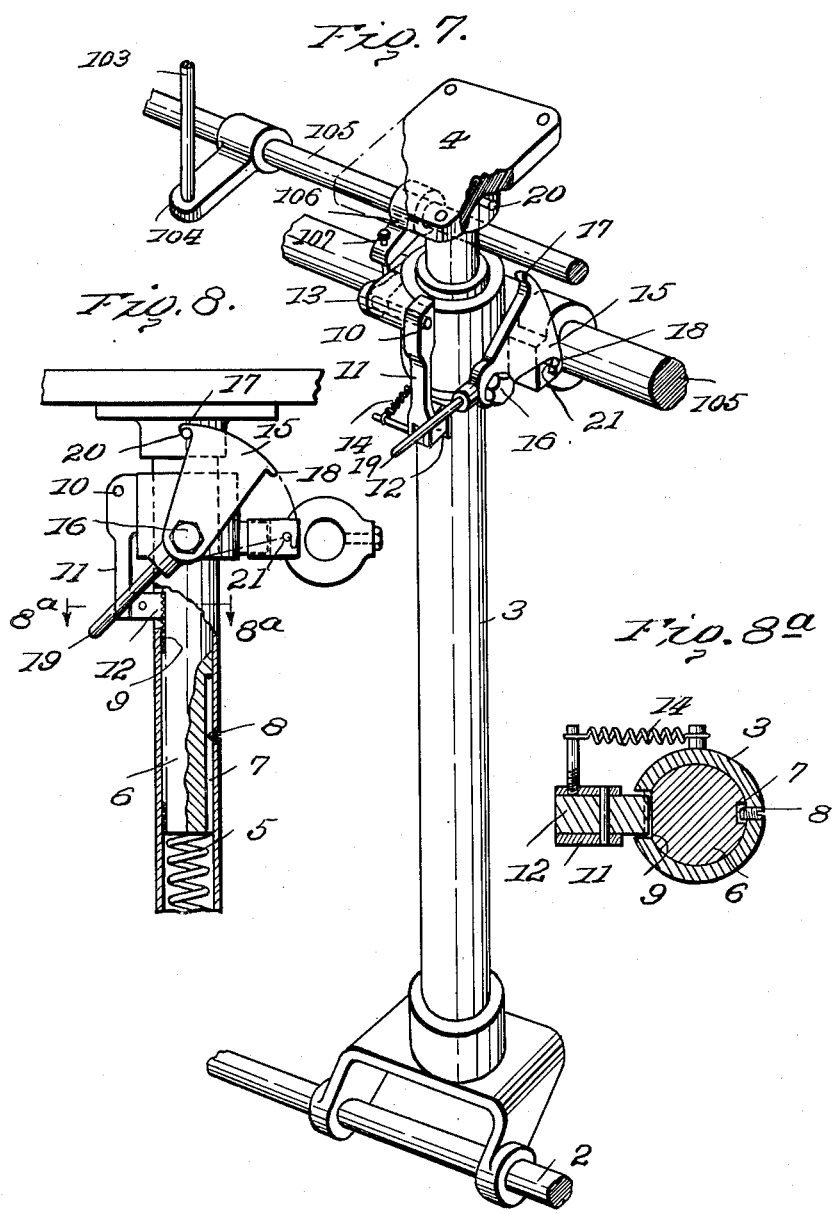
INVENTOR.
Walter H. Smith
BY
Atty Feb. 24, 1953 W. H. SMITH 2,629,590
COLLATING MACHINE
Filed Feb. 2, 1949 17 Sheets-Sheet 8
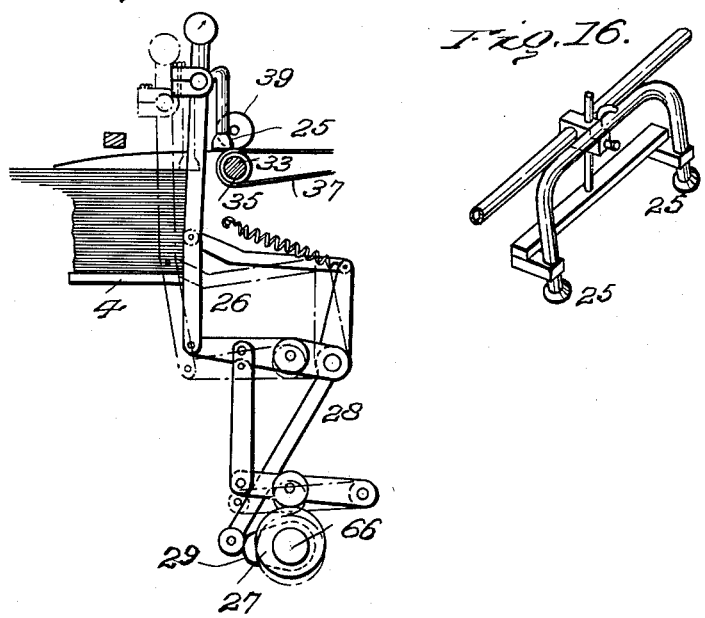
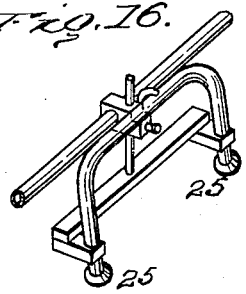
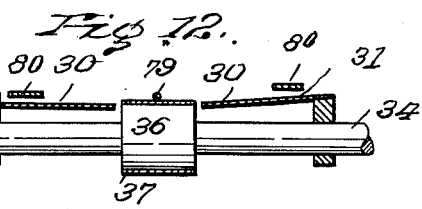
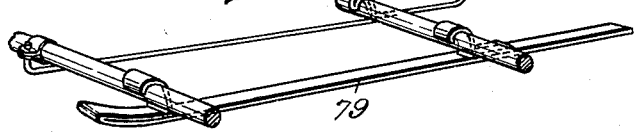
INVENTOR.
Walter H. Smith.
BY
Atty.

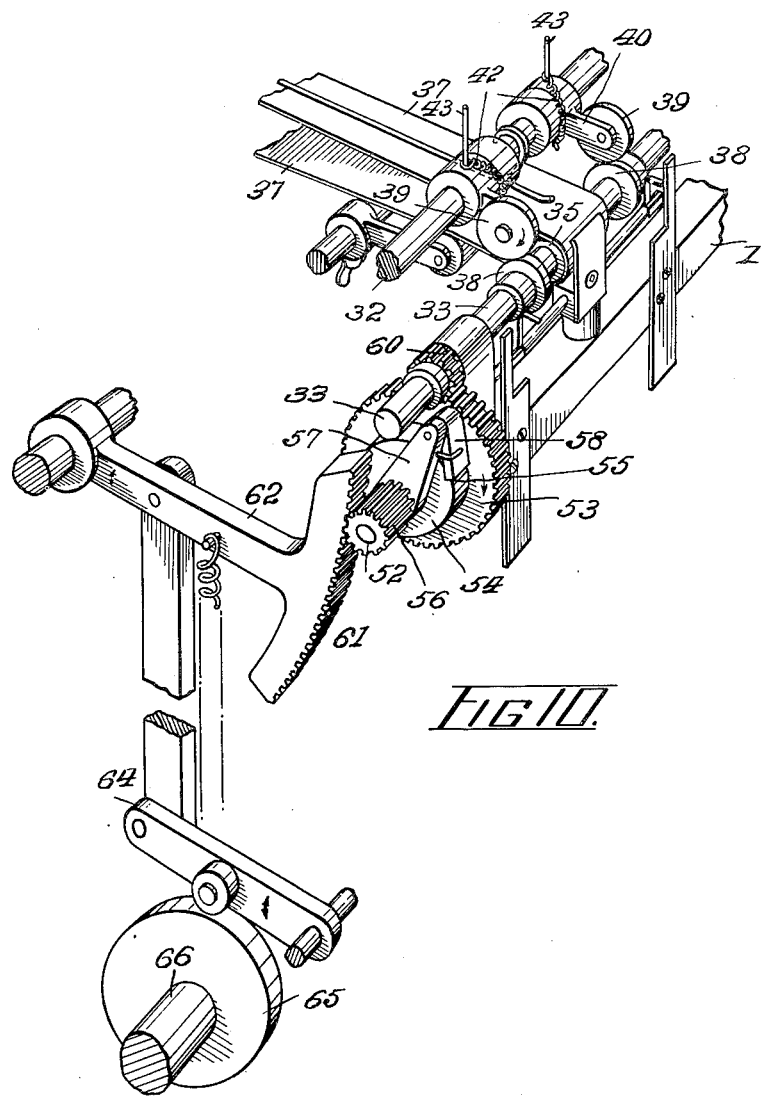

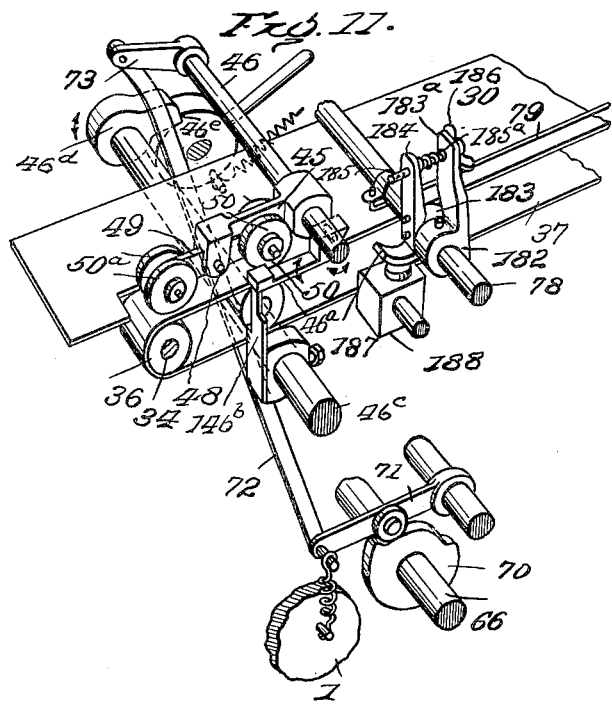

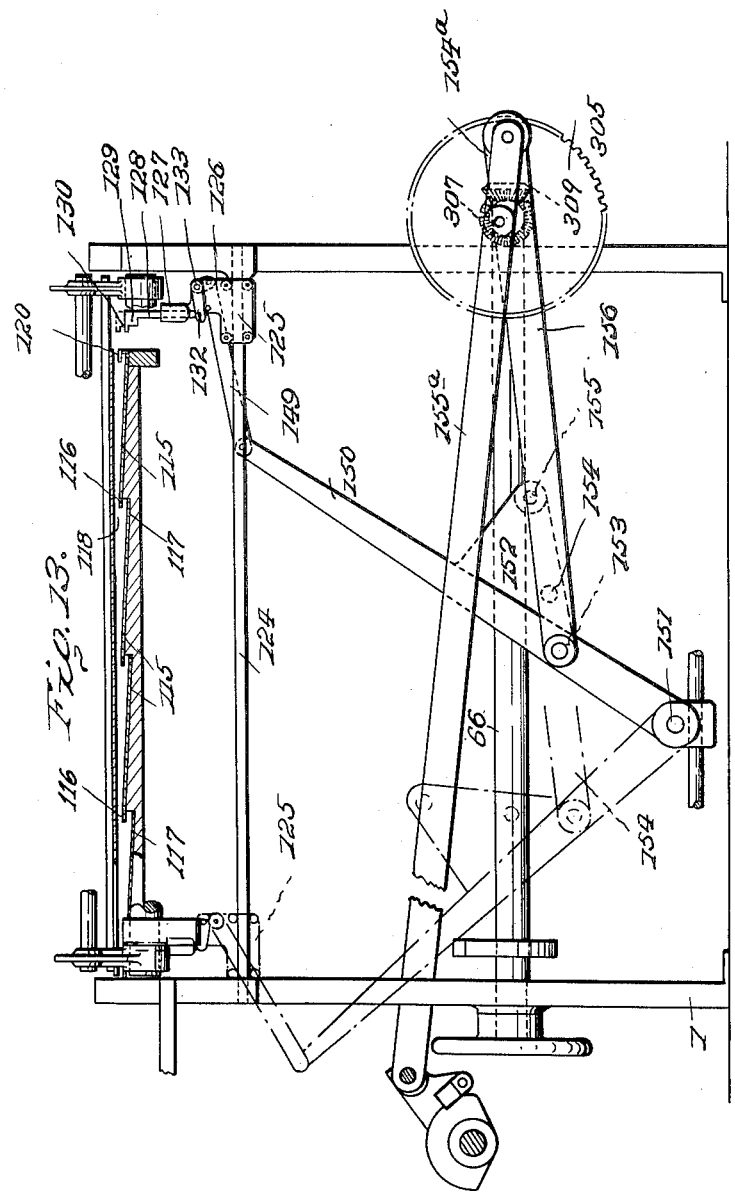

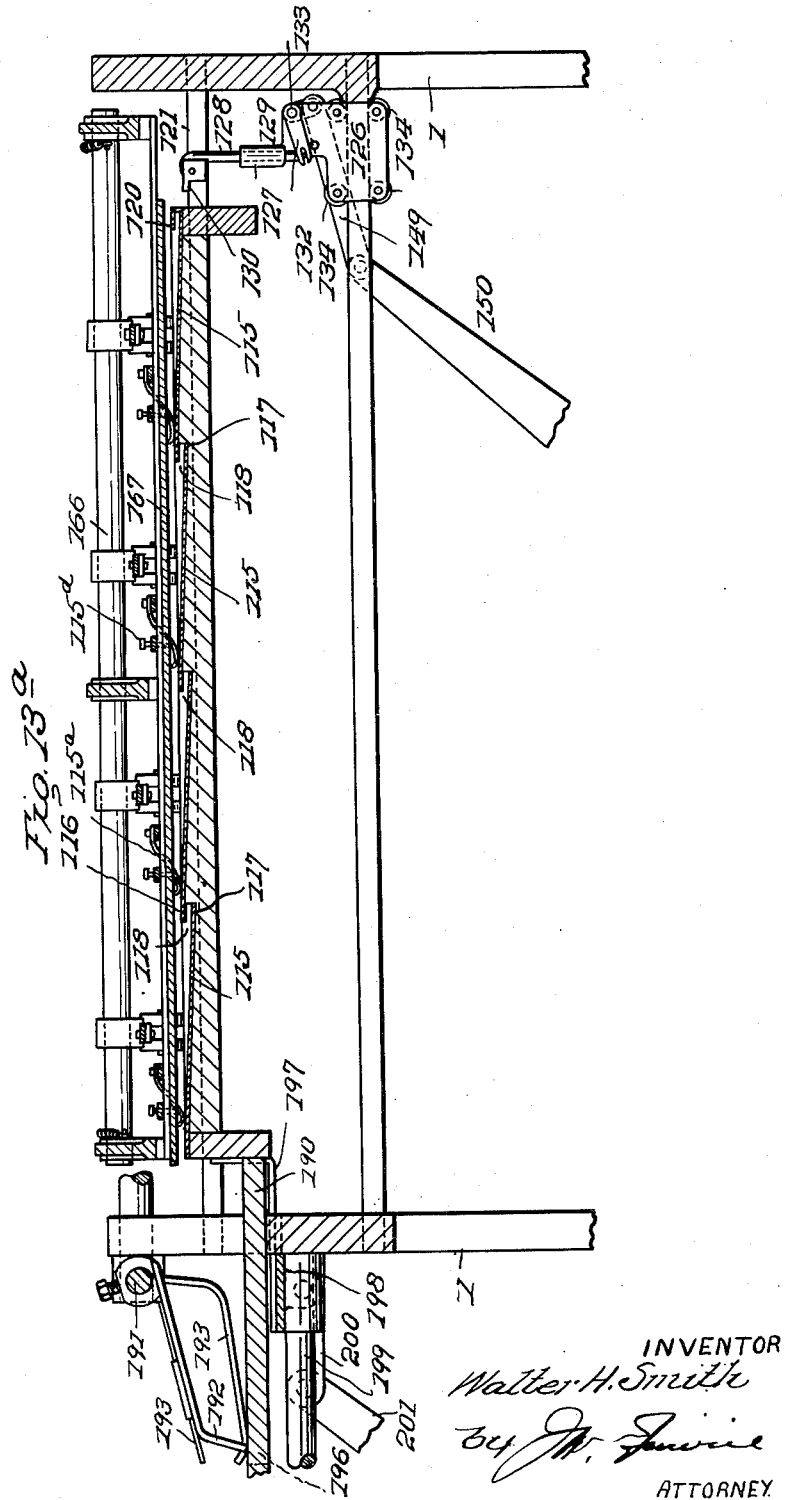

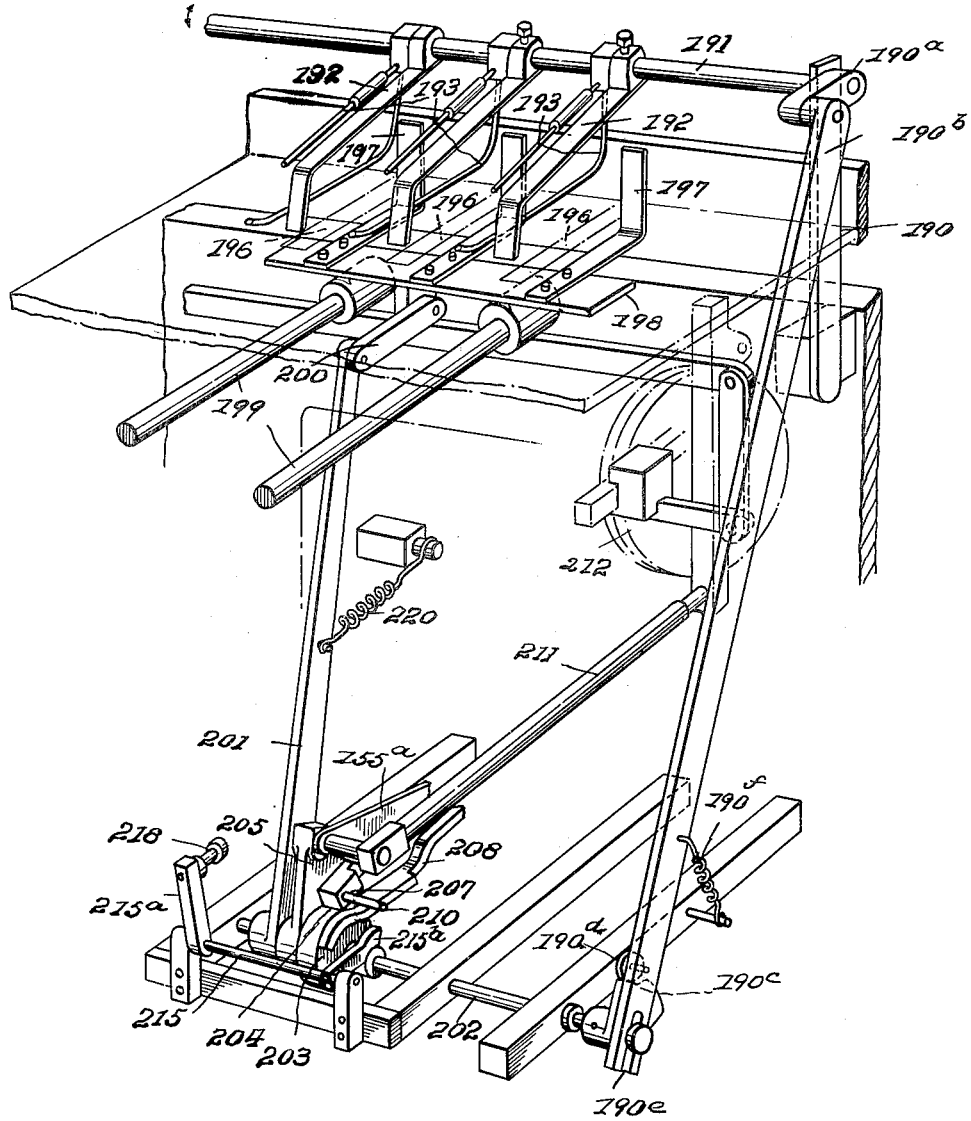

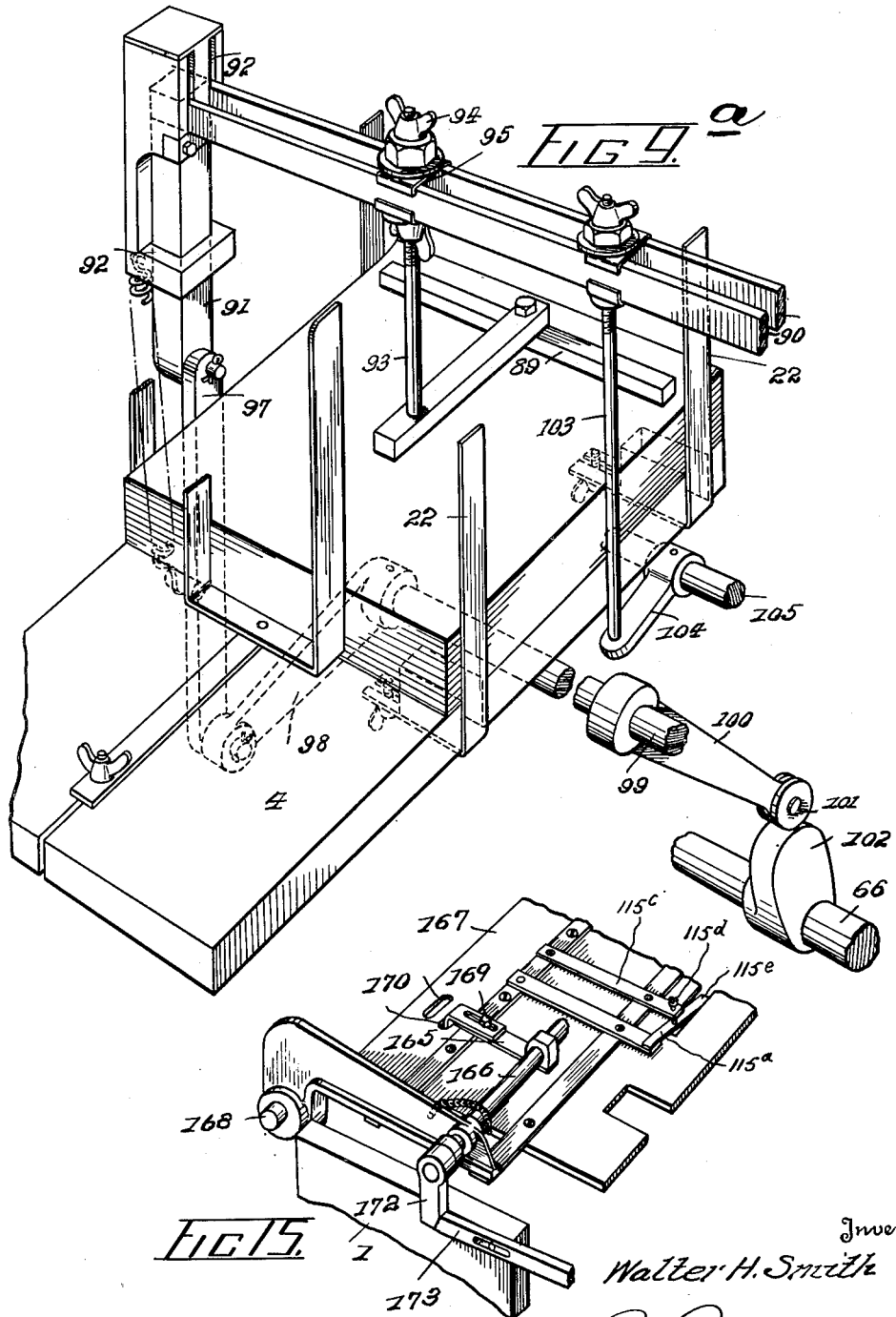

Feb. 24, 1953 W. H. SMITH 2,629,590
COLLATING MACHINE
Filed Feb. 2, 1949 17 Sheets-Sheet 15
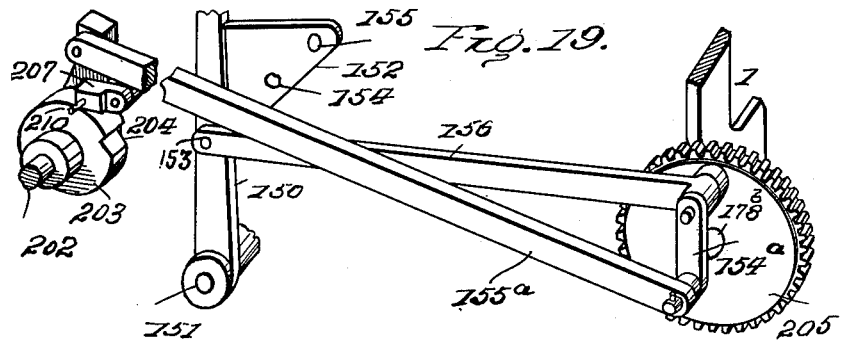
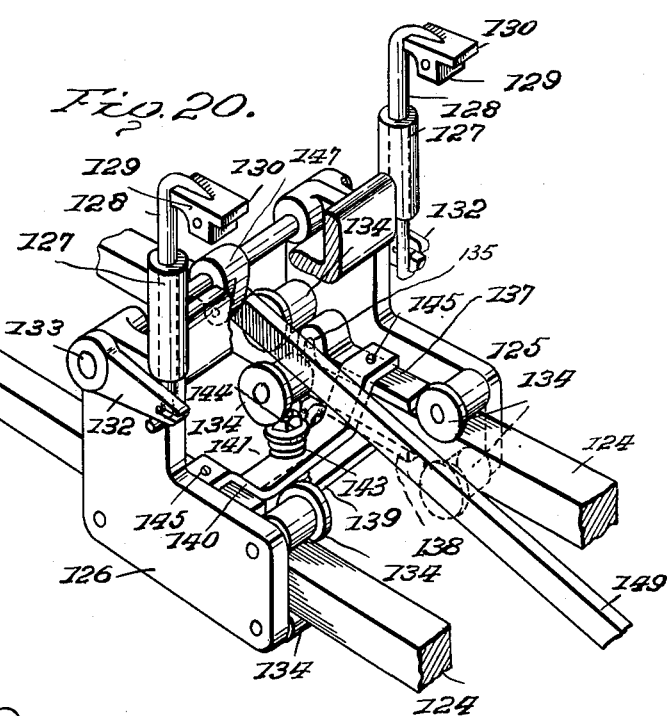
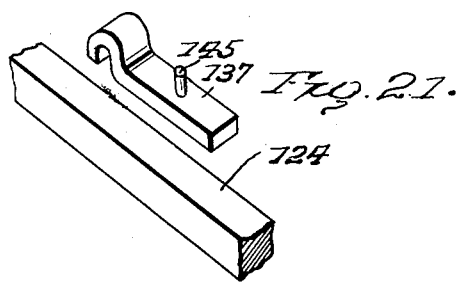
INVENTOR.
Walter H. Smith
BY
Atty.

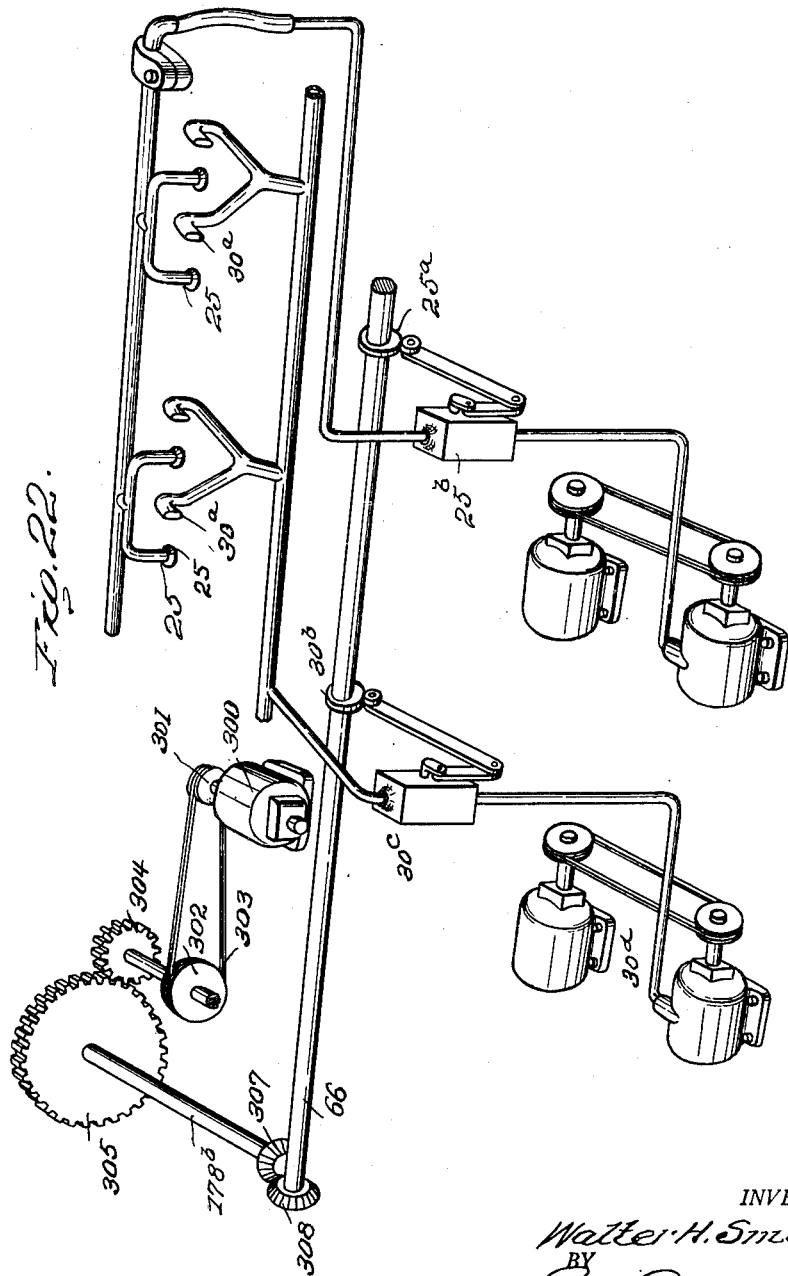

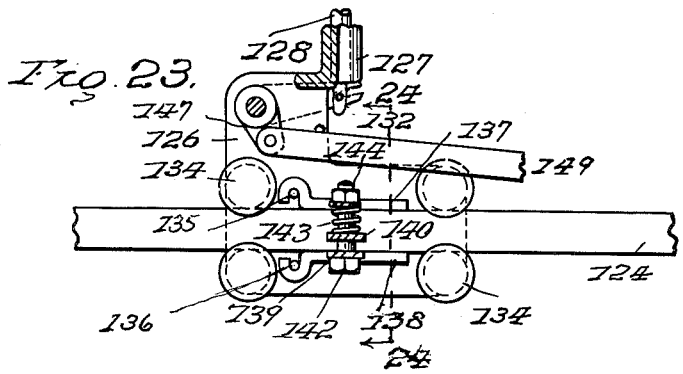
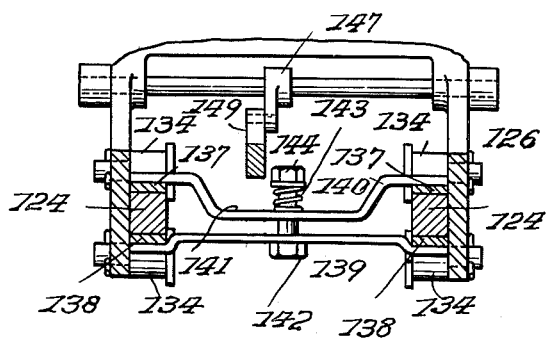
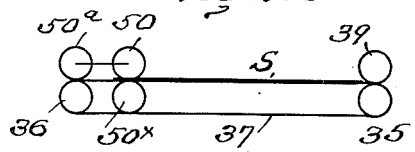
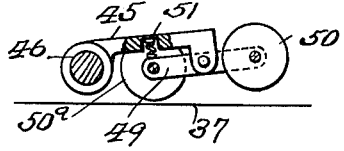
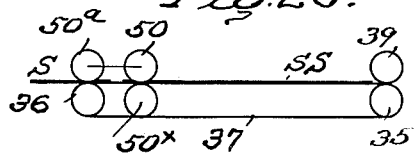
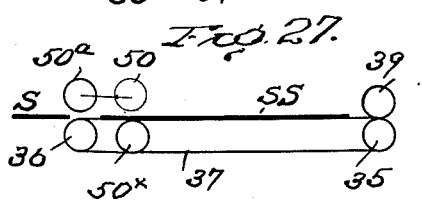
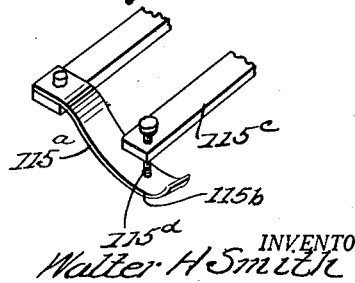

Patented Feb. 24, 1953

2,629,590

UNITED STATES PATENT OFFICE 2,629,590

COLLATING MACHINE

Walter H. Smith, Toronto, Ontario, Canada; Mary Agnes Johnston, administratrix of said Walter H. Smith, deceased, assignor to Commercial Lithograph Company, Ltd., Toronto, Ontario, Canada Application February 2, 1949, Serial No. 74,093

14 Claims. (Cl. 270—58)

This invention relates to a collating machine designed primarily for gathering or collating a series of sheets of paper superimposed one over the other to form pads or the like where an original and one or more duplicates are required.

I am aware collating machines are old in the art, but because of the nature of the product the machines are used on, namely, paper of different kinds, sizes and thicknesses, considerable difficulty has been experienced in rapidly and effectively assembling the sheets.

It has heretofore been the custom to collate sheets by, broadly stated, simply introducing a series of sheets to a plurality of tables, and then gather the sheets in an assembled pile. I have found the problem goes far beyond the simple method of collecting and assembling the sheets, as many difficulties are encountered between the time the sheets are taken off the piles and eventually assembled in the desired form. According to my invention, I have found it to be absolutely necessary to provide certain specific mechanism, so arranged and coordinated that the sheets, while in transit from the beginning of the collating operation to the end thereof, are under substantially perfect control.

One of the objects of the invention is to provide a series of tilting supports carrying vertically adjustable tables to receive stacks of sheets of paper to be collated. Associated with the supports I provide manually operated locks, so designed that when the tables are in operative position to feed sheets to the machine, the supports are locked to the frame, and yet the tables are operable to feed the piles upwardly as the top sheets are picked off and fed to the feeding mechanism. The locks, however, perform an additional function, that is to say, when the tables are depressed in their supports to be tilted away from the frame of the machine, the tables are locked down in the supports to afford convenience in supplying the stacks of sheets to be collated.

A further object of the invention is to provide improved means, coordinated with suction pick-up means, for urging upwardly the piles of sheets on the tables as the top sheets on the piles are picked up and delivered to the feeding mechanism. This coordinating improvement involves the provision of specially designed devices to act in timed relation with the pick-up devices, so that as the sheets are picked up, the piles will be acted on to be raised to insure the upper sheets on the piles being at all times at the same level with relation to the entrance of the feeding mechanism.

As previously stated, I have found it is necessary to control the sheets of paper in passing through the various stages of collecting the sheets, and to that end, one of the objects of the invention is to provide specific improvements in the feeding mechanism as applied to a collating machine. This mechanism is so arranged that sheets are fed by one part to a second part of the feeding means and stopped. Then, in subsequent operations, the sheets stopped at the second part are fed to a series of collecting tables and at the same time other sheets are advanced by the first part to said second part. This involves an intermittent movement of the feeding mechanism, and between the advance movement of the sheets, the suction devices are operated to supply additional sheets, and the sheets previously introduced to the collecting tables are gathered and ejected in collated form.

Another object of the invention is to provide a series of collecting tables arranged at right angles to the feeding mechanism to receive the sheets therefrom, with the ends of the sheets overlapped, and a series of gathering fingers so arranged as to push the overlapped sheets one over the other in assembled relation and eject them from the tables.

A further object of the invention is to provide improvements in the means provided to raise the gathering fingers to eject the overlapped sheets and withdraw the fingers to be in position to eject subsequent sheets delivered on the tables.

A still further object of the invention is to provide means for varying the throw of the gathering fingers to accommodate the number of sheets to be collated.

A further object of this invention is to provide means to form a confined passageway for the sheets when gathering them one on the other, and so arranging the parts that the most delicate kind of paper can be quickly and automatically collated.

A further object of the invention is to provide a transparent cover forming the top portion of a passageway, through which the sheets pass to be gathered in piles, which enables an operator to observe the condition of the sheets and detect trouble if any occurs in the passageway. Furthermore, if and when the sheets are misplaced in their movement while being gathered up, the transparent cover is so arranged that it may be raised and the trouble corrected.

A further object of the invention is to provide improved means for removing groups of the gathered piles of sheets after they are ejected from the collecting tables.

A further object of the invention is to provide improved braking means for controlling the rapid movement of the gathering fingers.

These and many other objects and advantages will appear in the following specification and will be particularly pointed out in the claims.

In the drawings:

Figure 1 is a perspective view of a portion of the machine.

Figure 1a is a plan view of the collating machine, with duplicate parts omitted to avoid confusion.

Figure 2 is a side elevation.

Figure 3 is a view of the opposite side of the machine.

Figure 4 is a front elevation with parts broken away and parts in section.

Figure 5 is a central longitudinal section on the line 5—5 of Figure 1a of the upper part of the machine to illustrate the sheet-feeding mechanism and the collecting tables.

Figure 6 is a detail section of the sheet gathering mechanism in position to eject the sheets.

Figure 6a is a similar view but showing the position of the gathering fingers in lowered position.

Figure 7 is a perspective view of one of the sheet stacking tables and its support.

Figure 8 is a side elevation of the same, showing the table locked down in its support.

Figure 8a is a detail section on the line 8a—8a of Figure 8.

Figure 9 is a detail view of the suction pick-up means for advancing the sheets to the feeding mechanism.

Figure 9a is a detail perspective view of the sheet hold-down device which cooperates with the suction pick-up when sheets are lifted from the pack on the tables.

Figure 10 is a detail perspective view of the first part of the feeding mechanism.

Figure 11 is a detail perspective view of the second part of the sheet feeding mechanism.

Figure 12 is a detail transverse section on the line 12—12 of Figure 1.

Figure 13 is a sectional view taken on the line 13—13 of Figure 1a, but diagrammatically showing the collecting tables and at the same time showing the operating levers and looking toward the rear of the machine.

Figure 13a is an enlarged section taken through the collecting tables on the line 13a—13a of Figure 1a looking toward the front of the machine.

Figure 14 is a detail perspective view of fingers to remove the groups of collated sheets from the receiving tables.

Figure 15 is a detail perspective view of the transparent cover for the sheet collecting tables.

Figure 16 is a detail perspective view of the vacuum pick-up cups.

Figure 17 is a detail view of one of the paper hold-down elements.

Figure 18 is a detail side elevation of part of the counting mechanism.

Figure 19 is a detail perspective view of the connecting rods to operate the sheet gathering fingers.

Figure 20 is a detail perspective view of the sheet gathering fingers and the operating fingers.

Figure 21 is a detail view of one of the brake shoes.

Figure 22 is a diagrammatic perspective view showing the vacuum cup supports.

Figure 23 is a detail enlarged central section of the brake.

Figure 24 is a detail section of the brake taken on the line 24—24 of Figure 23.

Figure 25 is a diagrammatic view illustrating a sheet in the bite of the rear feed rolls just prior to same being elevated to release the sheet.

Figure 26 is a similar view showing the advanced sheet shown in Figure 19 being ejected to the collecting table and rear rollers just about ready to be elevated to release the bite on the sheets.

Figure 27 is a similar view but showing the rear rollers elevated and the two sheets and the belt at rest Figure 28 is a detail view of the rear roller mounting of the feed mechanism.

Figure 29 is a detail perspective view of a presser foot employed to hold a sheet in place on one of the collecting tables.

Loading tables 1 indicates a frame, and at the front end of same is a bar 2, on which four tubular standards or supports 3 are mounted, each carrying a loading table 4. (See Figures 2, 4, and 7.)

Four of such tubular supports and tables are shown in the drawings, although any number may be employed, and as they are all of the same construction, but one will be described.

Mounted in the tubular support is a spring 5, and engaging same is a plunger 6, on the upper end of which is mounted the table 4. The plunger is formed with a groove 7, engaged by a pin 8, to prevent the plunger turning in the support when tilted away from the frame. The plunger is also provided with a series of closely related ratchet teeth 9. A lug extends from the upper end of the support 3 and receives a pin 10, and on one end thereof is secured an arm 11, the lower end carrying a pawl 12, extending through an opening in the support to cooperate with the ratchet teeth 9. A lever 13 is secured to the opposite end of the pin 10 and extends rearwardly toward the frame 1. The pawl is operated to disengage it from the ratchet teeth 9 by mechanism to be later described, and is held in ratchet-engaging position by a spring 14 to hold the table in its adjusted position.

It is important that the tubular support and table be securely held in operative position with relation to the sheet-feeding mechanism, and with equal force it is essential the plunger and loading table be locked in the tubular support when loading the tables with a stack of sheets to be collated. To this end I provide a lock 15, pivoted to the standard at 16 and provided at its outer opposite ends with engaging fingers 17 and 18. (See Figures 7 and 8.) The lock is manually controlled and operated by a handle 19. Extending from the plunger 6 is a pin 20, and on a projection extending from a bracket on the frame 1, is a pin 21, the lock 15 cooperating with these pins to lock the plunger against movement to the tubular support in one instance when loading, or in another instance lock the table to the frame of the machine to position the pile of sheets on the loading table to appropriate sheet-feeding means.

The loading table is provided with guides 22 to confine the stack of sheets during the feeding operation. For the purpose of accommodating sheets of various sizes, certain of these guides of course are adjustable.

When it is desired to lock the table to the support for loading purposes, it is depressed against the tension of the spring 5 and the lock 15 is turned to engage the finger 17 with the pin 20, which locks the table in its lowermost position. Then the standard is tilted forward in inclined position for convenience in loading the stack of paper, as shown in Figure 2, a chain 23 being employed to limit the forward movement.

*Suction cups to pick up the top sheet from a pack on a loading table*

I have shown specific means for picking up and introducing sheets of paper to the feeding means, although any suitable pick-up means may be employed. The top sheets of the stacks on the tables are picked up by suction cups 25 arranged adjacent the loading tables when the latter are locked to the frame. As all the sheet pick-up units are the same, but one will be described, although it is to be understood all the cups are simultaneously operated.

The cups 25 (see Figures 9, 16 and 22) are operated by a system of levers 26 actuated by a cam 27 to raise and lower them at the proper time, and a second system of levers 28, actuated by a cam 29, to impart a rearward movement to the cups when raised by the cam 27 to present the end of the sheet picked up to the first part of the sheet-feeding means. It is of course to be understood when the cups are lowered to pick up a sheet, vacuum will be induced, and when the sheet is in the grip of the feeding mechanism, vacuum will be cut off. The means for controlling the vacuum is conventionally shown in Figure 22, wherein 25a indicates a cam, 25b a valve, and the usual motor and pump, as is common in the art.

*Feeding means*

The feeding means adjacent each table comprises a first part and a second part to properly control the sheets in transit to the sheet gathering means. Supported on the top of the frame 1 are platforms 30 (see Figure 12) which slightly transversely incline, as shown at 31, for a purpose to be described. At the front of the platforms is a tie rod 32 and a shaft 33 and at the rear of the platforms is a shaft 34.

Four separate feeding units are shown in the drawing, one for each loading table, but as each unit is the same, but one will be described.

On the shafts 33 and 34 are rollers 35 and 36, around which pass an endless belt 37 (see Figure 10). Adjacent each side the roller 35 on shaft 33 are rollers 38 which cooperate with and engage rollers 39 mounted on stub shafts carried by arms 40 freely rockable on the tie rod 32. The rollers 38 and 39 are located each side the front end of the belt 37 to form with the belt a paper grip or bite. Adjacent the hub of each arm 40 is a collar secured to the tie rod 32, and to each collar is attached a spring 42, the other end of which is attached to the adjacent arm. Thus the rollers 39 are held in resilient contact with the rollers 38 to cooperate with the belt 37 in feeding the sheets. Handles 43 extend from the hubs of the arms 40, so that if a sheet is misplaced, the operator can lift the rollers 39 and free the sheet and straighten it out. Thus the rollers 38 and 39 form with the belt, what I term, the first part of the feeding means, the belt, however, being common to both the first and second parts of said feeding means, the latter part to be now described.

Spaced from the roller 36, at the rear end of, and above the belt 37, is an arm 45 mounted on a shaft 46. (See Figures 5 and 11.) At the end of arm 45 is loosely pivoted at 48, a frame 49, the opposite ends of which carry pairs of rollers 50, indicated for clarity as advance rollers 50 and ejecting rollers 50a, adapted to engage the belt 37 in the feeding operation.

The rollers 50a are mounted directly over the belt and belt roller 34, and a roller 50x is mounted between the belt in line with the roller 50. The rollers 34 and 50x thus provide means for both sets of rollers 50 and 50a to equally form bites with the belt. In other words, by associating the rollers one with the other, as described, yielding of the belt, and possible releases of the biting action on a passing sheet, are avoided.

As will be later described, the rollers 50 and 50a are intermittently lowered to contact with the sheet on the belt, and to insure firm contact, a small spring 51 is interposed between the arm 45 and frame 49. (See Figure 28.)

The first and second parts of the feeding mechanism are operated in timed relation by different actuating means, although the belt, which is common to both parts, is operated by the front part actuating means.

In Figure 10 is shown the first part actuating means. On a shaft 52 supported in the main frame is loosely mounted a gear wheel 53, and attached thereto is a disk 54 having a tooth 55. Also fixedly mounted on shaft 52 is a pinion 56 having an arm 57, carrying a pawl 58, to engage to tooth 55. The gear wheel 53 meshes with a pinion 60 on the shaft 33, and the pinion 56 meshes with a segmental gear 61 on an arm 62 pivoted on the frame. The arm 62 is pivoted to a rocking lever 64 having a roller contacting with a cam 65 on a cam shaft 66.

At the prescribed time, the first part of the feeding mechanism is operated, that is, the cam 65, through the described connections, operates the segmental gear 61, pinion 56 and arm 57, which in turn causes the pawl 58 to engage the tooth 55, and through the gear 53 in engagement with a pinion 60 on the end of shaft 33, rotates said shaft and consequently the belt is operated to feed a sheet from the first part to the second part of the feeding means. This movement is so timed and designed to operate that when a sheet is delivered to the belt 37 by the suction cups, the sheet is gripped between the rollers 38 and 39 and the belt 37 and is advanced on the belt and over the surface of the platforms to the second part of the feeding mechanism.

When the sheet S is in the bite of the first part of the feeding mechanism, the frame 49 is down and the rollers 50 and 50a are in contact with the belt and remain in contact until the advanced end of the on-coming sheet passes under and beyond the advance rollers 50, as shown in Figures 25 and 26. A moment thereafter, the belt operating mechanism comes into play and movement of the belt ceases, and simultaneously the means employed to raise and lower the rollers 50 and 50a is timed to tilt or elevate said rollers out of contact with the belt. Thus, when the rollers are elevated, the sheet and belt are at rest, as shown in Figure 27.

In this interval of stoppage of the belt and sheet, a subsequent sheet S—S is being picked up by the vacuum cups and introduced to the bite of the rollers 38 and 39 and belt of the first part of the feeding means, the mechanism being timed to start the rollers 38 and 39 slightly before the end of the sheet being delivered by the vacuum cups reaches the bite of the roller. When the movement of the rollers 38 and 39 starts, the belt also starts to move and simultaneously the frame carrying the rollers 50 and 50a is lowered in contact with the belt, and the new subsequently introduced sheet S—S is moved by the front rollers and belt of the front part of the feeding means until the advanced end of the sheet passes some distance beyond the bite of the advance rollers 50. When the advanced end of the sheet S—S has moved just beyond the advance rollers 50, the rear end of the sheet S—S is just about ready to leave the bite of the rollers 38 and 39, as shown in Figure 26. The feed continues until the rear end of the sheet S—S is released from the bite of the rollers 38 and 39, and the advanced end is in the bite of the advance rollers 50 of the rear part of the feeding means, as shown in Figure 27. Now the frame and rollers 50 are raised and the belt is again stopped, at which time the vacuum cups are introducing a further sheet to the first part of the feeding means.

While the subsequently introduced sheet S—S is being advanced, the previous sheet S is ejected by the pair of rollers 50a and the belt, as shown in Figure 27, and by the time the subsequent sheet S—S reaches the position shown in Figure 27, the advanced sheet S has been delivered to the adjacent collecting table. At the moment of ejection of the first sheet S from the second part of the feeding means, the frame and rollers 50—50a are raised and movement of the belt and subsequent sheet ceases and the operation of supplying sheets to be collated is repeated.

It is evident from this description that the same operation of advancing the sheets takes place irrespective of their length, less the distance between the respective rollers of the first and second parts of the feeding means.

Intermediate the front and rear feed belt rollers 35 and 36 is a shaft 78, and mounted on this shaft is a loosely supported wire 79 which rests by gravity on the belt. The forward end of the wire is supported on the tie rod 32 and is slightly upturned to guide the sheet to the feeding mechanism. The sheet passes under the wire, which gently presses the sheet in close contact with the belt, to iron out any wrinkles, and to additionally hold the paper in contact with the belt and under control.

Thus, when short sheets are fed by the feeding means, the wire will maintain such sheets in contact with the belt until the rollers 50, 50a, grip it. Flat resilient-like strips 80 are hung on shaft 78 and extend forwardly and terminate at the front end of the belts, the sheets passing under these strips in transit to the collecting tables, these strips and the wire insuring proper position and control of the sheets in transit over the platform.

*Means cooperating with the suction cups to hold the stacks of paper in order when picking up a sheet from the tables*

It is important that the stacks of sheets on the loading tables be controlled with reference to the pick-up means and the feeding mechanism. I therefore provide a presser member 89 to act on the top of each stack to gently engage same when the vacuum cups are lowered to pick up the top sheet on the pack and elevated immediately the sheet is in the grip of the vacuum cups. The presser members 89 are mounted on a pair of bars 90 connected at their ends to rods 91, vertically reciprocated in guides 92 extending upwardly from the frame (Figure 9a).

A rod 93 forms part of the presser bar and extends through the bars 90 and is threaded to receive adjusting nuts 94 and clamps 95. This arrangement affords means for adjusting the position of the presser bar with reference to the top surface of the pack of sheets on the table below. The presser bar is vertically movable and is operated by links 97 pivoted to the slides 91, and levers 98 on a shaft 99, provided with a lever 100, having a roller 101 to engage a cam 102 on the cam shaft 66.

Adjustably mounted on the bars 90 and depending therefrom is a rod 103. This rod is adapted to contact with a short arm 104 on a rock shaft 105 mounted in the frame. On the shaft 105 is a short arm 106, provided at its free end with an adjusting screw 107 which lies directly over the lever 13. (See Figure 7.)

When the presser bar 89 lowers toward the top of a stack of sheets on the table, the rod 103 contacts with the arm 104 and depresses the arm 13, which in turn releases the pawl 12 and permits the spring 5 to move up the table and pack.

The movement of the presser bar is limited, and it not only serves to hold the pack in place in the interval incident to the distance between the teeth on the plunger, but it serves to exert pressure on the stack to exude any air between the sheets.

In practice, the distance between the teeth 9 on the plunger is about $\frac{1}{16}$ of an inch, so that as the top sheet is picked up and removed, the table and the pack of sheets continue to go up and down under the influence of the presser bar on the one hand and the spring 5 in the table support on the other hand. Then when a number of sheets have been taken from the pile within the distance between the teeth, the pawl engages the next tooth. Hence, the pack, within the range of two teeth, is delicately raised by the spring 5 and lowered by the presser bar and at the same time the sheets are retained in closely packed relation while the vacuum cups are functioning.

When the vacuum cups lift a sheet from the pile on the table, a blast of air is introduced between the top sheet and the next adjacent sheet through pipes 30a located between the frame and the pile of sheets. The air blast is controlled by a cam 30b and valve 30c, a motor and compressor 30d being provided to supply the air (Figure 22).

*Sheet collecting tables*

The collecting tables are important in this invention as it is at this point considerable difficulty is and has been experienced in known collating machines.

Arranged at right angles to the belts 36 is a series of collecting tables 115. The tables incline slightly toward their delivery ends, the advanced ends 116 overlapping the low ends 117 of the adjacent table to form spaces 118 to receive the side edges of the sheets delivered to the tables by the feeding means. In addition to the overlapping ends of the tables forming spaces to receive the sheets, the arrangement insures the sheets being in proper position to be gathered up one on top of the other and ejected in collated form (Figures 13 and 13a).

To provide a space corresponding to the space 118 between the ends of the overlapping tables for the sheets fed by the left hand feed belt, I provide a strip 120 fastened to the frame to overlap the low end of the first adjacent table. The overlapping of the sheets is essential when collating sheets or forms all bearing the same numbers in one group.

The collecting tables are mounted on a platform supported by cross bars 121 extending transversely across the main frame. The tables are spaced apart to form a track 122, and the tables adjacent the terminal of the feeding mechanism are spaced therefrom to form a track 123.

The tables are arranged side by side, and as stated, are spaced apart to provide the central slot to form a track 122 for the sheet gathering fingers, while the second track 123 is formed between the feeding means and the tables next the same for the companion gathering fingers. It has been found in practice in the sudden and rapid movement of the gathering fingers that they strike the edges of the sheets as they are advanced over the tables, and the blows have a tendency to knock the sheets sidewise and hence out of alignment (Figure 29). To meet this situation, I provide resilient presser feet 115a secured on the cover 167 to gently bear on the overlapping ends of the tables next the track between the tables and the feeding means. Each presser foot 115a consists of a flat piece of resilient metal secured at one end to the cover, its opposite end being bent downwardly and upwardly to provide a pressure surface 115b to bear gently on the table and the end of the sheet when under the said surface 115b and hold the sheet until the fingers advance and push any out of line sheets in alignment with the other gathered sheets. Over each presser foot 115a is secured a flat plate 115c having an adjusting screw 115d to engage the presser foot 115a to regulate the tension on the end 115b.

The presser feet extend through slots 115e formed in the cover and are effective to insure the sheets being held in proper position to be brought in proper alignment while passing over the tables.

These presser feet are usually only necessary on the tables adjacent the feeding means, two being located on the cover to engage a sheet when passing over the overlapped end.

Below and spaced from the cross bars 121 are similar bars 124, and on the bars reciprocates a carriage 125 (Figures 6, 6a, 20 and 23). The carriage comprises a frame 126, on opposite sides of which are vertical guides 127 to receive the shanks 128 of gathering elements 129, the upper ends of which extend at right angles to the stems and have overhanging projecting fingers 130. The lower ends of the shanks are provided with studs to fit in the slotted ends of levers 132 secured to a shaft 133 mounted in the carriage frame.

Mounted on stub shafts on the inside of the carriage frame are rollers 134 which engage the upper and lower surfaces of the bars 124 as the carriage is reciprocated, as will be presently explained.

On the frame 126 are short studs 135 and 136, and loosely hung on these studs are brake shoes 137 and 138 which engage the upper and lower surfaces of the bars 124. Extending transversely under the lower brake shoe 138, is a bar 139, and extending over the shoes 137 is an upper transverse bar 140 having a centrally disposed portion to form a seat 141. A bolt 142 connects the central portions of the bars 139 and 140, and around the bolt and supported on the seat 141, is a spring 143, the tension of which is regulated by a nut 144. Near the terminals of the bars 139 and 140 are openings which receive studs 145 on the shoes. Thus, the shoes, while held in operative relation with the bars, are nevertheless free to be adjusted for braking action of the carriage on the bars.

Extending from the shaft 133 is an arm 147, and pivotally connected to this arm is a link 149 pivoted at its outer end to a lever 150. Lever 150 is pivoted at 151, and substantially mid-way its length is a lug 152 formed with three openings, 153, 154 and 155. As shown in Figure 13, a pivot secures a connecting rod 156 at opening 153. The outer end of this connecting rod 153 is pivoted to a crank lever 154a, which in turn is pivoted to a second connecting rod 155a.

The upper ends of the gathering elements operate in the tracks 122 and 123 formed between the collecting tables and between the tables and the feeding means and are reciprocated through the lever connections previously described.

The upper surfaces of the fingers 130 are normally below the level of the upper surfaces of the collecting tables (see Figures 6a and 13a), and of course are at rest while the sheets are being transferred from the feeding mechanism to the tables. When the sheets are deposited on the collecting tables and up against the stops 169, the gathering elements come into position behind the sheets (see Figure 6) to collect them, one on top of the other. As lever 150 is operated through the connecting rod 149, arm 147, and lever 132, the gathering fingers 130 are first elevated above the plane of the surface of the sheets on the collecting tables. Continued movement of the levers pulls the carriage 125 and of course the gathering fingers across the slots in the tables and ejects the sheets in collated form to a receiving table.

This motion is so rapid, hammering of the mechanism in the reciprocating movement is avoided by the brakes. The brake shoes of course are adjusted by regulating the tension of the spring 143. As the carriage is advanced in the sheet-collecting and ejecting direction, the friction of the shoes on the bars reduces the blow at the time the reciprocating movement is about to be reversed, and of course the shoes have the same effect when the carriage is returned to normal position.

Immediately the carriage commences to return to normal position through the medium of the lever connections described, the gathering fingers are lowered below the level of successive sheets, which at this time are being delivered to the collecting tables by the feeding mechanism. Obviously, by this arrangement, the tracks and the surfaces of the tables are unobstructed when the sheets are delivered by the feeding mechanism.

*Adjustable stops and plastic transparent cover*

Because of the rapid operation of the mechanism, and as the machine is constructed to collate thin as well as thick sheets of paper, it is highly essential that the sheets be under control and properly aligned in regular order in transit from the time they are picked up by the vacuum cups until they are ejected from the collecting tables. Therefore, two factors are essential in the practical operation of the parts when collecting the sheets. First, when the sheets are introduced to the collecting tables, opposite same are movable and adjustable stops 165, mounted on a shaft 166, supported in bearings on a plastic transparent cover 167, the latter being pivoted on a shaft 168. The stops have their free ends extended downwardly to engage the tables 115 and are in sections, slotted and adjustable by bolts 169 passing through the slots. The turned-down ends of the stops extend through selected openings 170 in the cover to accommodate sheets of different lengths fed to the tables by the feeding means.

The transparent plastic cover is held in position by its own weight and is counterbalanced by a weight 171 for convenience in lifting it. Therefore, the cover and the stops may be conveniently raised and lowered at will. The forward end of the cover extends beyond the rearmost rollers 50 and 50a of the feeding means, slots being provided for reception of said rollers.

On one end of shaft 166 is an arm 172 adapted to be engaged by a slidable lever 173 pivoted at one end to an arm 174 of an L-shaped lever 176 mounted on a stub shaft 175 (see Figure 3). To the other arm of the L-shaped lever 176 is pivoted a lever 177 pivoted to a rocking lever 178 having a roller at its end engaged by a cam 178a on the shaft 178b.

When the gathering fingers commence to operate to collect the sheets on the tables, the cam 178a, through the connections described, forces the lever 173 against the arm 172 which lifts the stops above the cover, thus insuring the sheets being free of possible obstruction when in movement on the tables. When the sheets are advanced on the tables, one on top of the other, their ends are prevented from turning upwards by the cover 167.

When the gathering fingers reach the limit of their sheet collecting stroke, the cam 178a is shaped and timed to allow a spring 180 to lower the stops, against which subsequent delivered sheets abut.

*Automatic stopping mechanism*

If, for any reason, two or more sheets should be fed over the platforms, I provide means associated with the feeding means for detecting the error. On shaft 78 are fixed collars 182 (see Figures 1 and 5) and adjacent these collars are loosely mounted collars 183. From the fixed collars extend bars 183a, and like bars 184 extend from the loose collars, and between these bars is a screw 185 supporting a spring 185a, and by tightening nuts 186, tension on the springs can be regulated. On the bottom of the loose collars are shoes 187, and opposite these shoes are micrometers 188, so that if perchance two sheets should be fed by the feeding means, they would be stopped between the shoes and the micrometers. Thus, there would be no sheet on the belts between the shoes and the rear part of the feeding means.

In the rear of the shaft 78 and on shaft 46 are pivoted trips 46a, which are reciprocated when shaft 46 is reciprocated by cam 70 (see Figure 11). The trips 46a ride over the surface of the sheets in transit, but if no sheet is fed past the shoes 187, the trips 46a will engage fingers 46b secured to a shaft 46c. On the end of this shaft 46c is a pawl 46d engageable with a tooth 46e on a disk, of switch tripping mechanism (not shown) which controls on and off of the current operating the power motor, the pawl being normally held in engagement with the tooth by a spring. If sheets are caught between the shoe 187 and the micrometer, obviously as the trips 46a are rocked rearwardly, and if no sheets are present, the trips 46a will drop down and engage the fingers 46b and trip the pawl 46d and thus operate the switch control and stop the machine, and discontinue the operation of the counting mechanism without interrupting the count of the sheets. After adjusting the sheets which caused the trip to operate, by manually resetting the latch, the operation can be continued.

*Receiving table*

On the side of the main frame, in alignment with and below the level of the collecting tables, is a receiving table 190 to receive the collated sheets ejected from the collecting tables. On a shaft 191 extending across and above table 190, are stops 192 to limit the movement of the assembled sheets when discharged from the collecting tables. Also loosely mounted on shaft 191 are balanced wires 193 to gently rest on the sheets as they are piled up on the table 190. The stops are raised and lowered by an arm 190a connected to a lever 190b mounted on a shaft 202. When the shaft 202 is rocked, a cam 190c engages a roller 190d on the lever 190b and raises it, which rocks the shaft 191 and thus elevates the stops. A slot 190e formed in the end of lever 190b guides said lever in its upward movement, while a spring 190f returns the lever to its normal position.

When a predetermined number of assembled groups of sheets have been collected on the table 190, the stops 192 are raised by the cam 190b and the connections described, and the groups of sheets are ejected further back on the table to be removed by the operator. This movement is accomplished by providing the table with slots 196, through which pusher fingers 197 project from under the table. These fingers are mounted on a plate 198 reciprocal on bars 199. Pivoted to the plate 198 is a lever 200 pivoted at its outer end to a lever 201 mounted on a shaft 202.

On shaft 202 is a disk 203 having a tooth 204, and alongside this disk is an arm 205 loosely mounted on the shaft. To this arm is pivoted the lever 155a pivoted to crank 154a. Pivoted to the arm 205 is a pawl 207 which cooperates with the tooth 204, but which normally rides on the periphery of the disk 203. The pawl 207 is held out of reach of the tooth 204 by a pivoted lever 208 curved at its end, and over this curved end is a pin 210 extending from the pawl 207. Operating in conjunction with the arm 205 and lever 155a is a lever 211 which operates a counter, indicated at 212 in Figures 4, 14 and 18.

The counter 212 is only conventionally shown and may be of any well known type. As shown, when the rod 211 reciprocates, it actuates a pawl 211a which operates a ratchet wheel 211b of the counting mechanism. On the face of the ratchet wheel is a disk 212 provided with notches 214 with which the toothed end of the lever 208 cooperates.

Extending upwardly from the frame are bearings for a shaft 215, from which extends a lever 215a having an adjusting screw 213 in line with the levers 201.

The counter is timed to count a predetermined number of groups of sheets delivered on the receiving table 190. For instance, as the sheets are ejected from the collecting tables, the lever 155a is reciprocated, which in turn reciprocates the lever 211, which operates the counter. Thus, the disk 213 is actuated and when a notch 214 is in position for the toothed end of lever 208 to engage, the curved end of lever 208 drops and the pawl 207 drops into engagement with the tooth. When the pawl is in engagement with the tooth, motion is imparted to the shaft 202, which actuates the levers 201 and 190a, which raises the stops and quickly forces the fingers against the pile of grouped sheets and pushes them rearwardly on the receiving table 190. When the lever 201 strikes the screw 218, it rocks the shaft 215 and a projecting lug 215b thereon engages the pin 210 and disengages the pawl from the tooth 204. This permits the curved end of lever 208 to rise and disengage the rear end from the notch 214 in the disk on the counter. At that moment a spring 220 returns the stops and pusher fingers to normal position.

300 indicates a motor, and on its shaft is a pulley 301, around which and a pulley 302 trails a belt 303. On the shaft carrying the pulley is a pinion 304, which meshes with a gear wheel 305 on the counter shaft 178b. On the end of the counter shaft is a bevelled gear 307 which meshes with another bevelled gear 308 on the cam shaft. Of course, it is understood all the cams on the cam shaft are timed with relation to the desired motion of the parts described, but it is not deemed necessary to specifically define the outline of and configuration of said cams.

*Operation*

For convenience in understanding the operation, one of the loading tables will be described when loading and the steps followed in the transfer of several sheets to a collecting table, it being understood, of course, that all or a selected number of sheets will be simultaneously collated.

The stacking table 4 is depressed in the tubular support 3 against the tension of spring 5, and the lock 15 is turned to engage the finger 17 with the pin 20 to positively lock the plunger and the support together. This disengages the finger 18 from the pin 21, thus permitting the table and its support to be tilted away from the frame. The loading table is tilted forward and held in that inclined position by the chain 23. The guides 22 are adjusted to the width and length of the sheets, and a stack of such sheets are placed on the table. The stack of sheets having been put in place, the table and its support are returned to a vertical or operative position, and the lock 15 is turned to release the finger 17 from the pin 20 and engage finger 18 with pin 21. This securely positions the table and its stack in proper position with respect to the feeding means.

The presser bar 89 is adjusted with reference to the top of the stack and the machine is started. The suction cups are lowered to pick up the top sheet and first lift it upwardly and thence move it rearwardly to the entrance of the feeding means. As the forward end of the sheet is lifted by the suction cups, it encounters a finger 350 and is flipped past same to insure that but one sheet on the stack is removed. As the sheet is lifted from the pile, blasts of air are ejected between the top sheet and the adjacent sheet to insure separation so that but only one sheet at a time will be lifted.

About the time the cups engage the top sheet of the stack, the rod 113 strikes the arm 104, and the screw 107 depresses lever 13, which releases the pawl 12 from the teeth 9, allowing the spring 23 to urge the pack on the table upwardly against the presser bar 90 to compensate for the sheet or sheets withdrawn. However, as previously stated, the stack of sheets are packed together by the presser bar and against the tension of the spring 15, with the result that in the rapid operation of the machine, the table is more or less vibrated up and down equal to or a proportion to the distance between the teeth, depending on the number of sheets removed from the pile.

The mechanism is so timed that the presser bar quickly descends on the stack, while the vacuum cups act somewhat more slowly when picking up a sheet than on their delivery stroke, and when the sheet is being fed by the belt and rollers, the pressure bar remains up, lowering to the stack quickly as soon as the rear end of the sheet has been withdrawn from under the bar to release the pawl 12 from the ratchet teeth 9.

Just prior to the end of the sheets being introduced between the front rollers 38, 39, and the belt 37, the appropriate cam operates the segmental gear 61, and through the pawl 58, the belt 37 and front rollers 35, 38, 39, are set in motion, and the rollers 50 are lowered in contact with the belts. The sheets are fed by the first part of the feeding means toward the rear of the machine until the advanced ends of the sheets are in the bite of the forward pairs of rear rollers 50. Just after the sheets are in the bite of the rollers 50, the forward ends are free of the front rollers, and then the parts are timed to lift the rear rollers and stop the belts. When the next sheets are about to be introduced to the feeding means, the rear rollers 50 are lowered and the belt is started and the previous sheets are delivered to the collecting tables and up against the stops 105 and under the cover 167. At the same time the subsequently picked-up sheets are in transit to the second part of the feeding means, consequently two sheets from each pile are being simultaneously advanced toward the collecting tables.

The sheets are delivered from the feeding means directly to the collecting tables, one side of the sheets passing in the passage formed by the overlapping tables, while the opposite ends are free to be pushed over adjacent sheets.

It is important at this point to emphasize the purpose of inclining one side of the feeding platforms. Bearing in mind the collecting tables incline transversely with reference to the belts, it follows that the sheets in transit over the platforms must be at substantially the same inclination as the collecting tables. Thus, by transversely inclining the platforms 30, as shown and described, the feeding platforms and the collecting tables are substantially on the same level and the sheets therefore will be directly delivered to and onto the inclined tables in an uninterrupted plane.

When the sheets from the belts have been delivered to the several collecting tables, the gathering elements are timed to operate to push the sheets one over the other and deliver them to the receiving table 190.

At this time, the counting mechanism operates, which is of importance, but is not specifically claimed, except in a broad way to claim it in combination with the means for grouping the collated sheets. The counter enables the operator to know how many sets or groups of sheets have been delivered to the receiving table 190, and when the predetermined number of such groups have accumulated, the stops 192 are timed to be raised and the fingers 197 operated to move the groups of sheets further out on the table beyond the stops.

Four separate feeding means are shown to feed four sheets at a time to the collecting tables, but the machine can be operated to assemble two or three sheets in a group as effectively as four, and this with but one change.

As previously described, lever 150 is provided with three openings 153, 154, 155. If three sheets are to be assembled, the pivot for lever 150 will be engaged in hole 154, while if but two sheets are to be assembled, the pivot of lever 150 will be engaged in opening 155. In other words, when assembling four sheets, the gathering fingers must be so set to engage behind the sheet on the collecting table next the fingers, and so, if three or two sheets are to be assembled, the throw of the gathering fingers is changed to limit their movement to be next the end of what will be the top sheet of the group of sheets to be collated and ejected. Thus, when four sheets are being grouped, the lever operating the gathering fingers will be set for their full throw, while if but two or three sheets are to be grouped, the throw of the fingers will be adjusted accordingly.

What I claim is:

1. A collating machine, comprising a series of inclined collecting tables, the end of each table overlapping and spaced from the end of the adjacent table, a series of paper feeding means at right angles to the inclined collecting tables, each said means including a platform, a portion of which is inclined corresponding to the inclination of the adjacent collecting table, a belt and cooperating rollers, and means for collecting the sheets one over the other and ejecting the collated sheets.

2. A collating machine, comprising a plurality of tables to receive packs of sheets of paper, a series of platforms, a feeding belt associated with each of the platforms to feed sheets from the piles on the tables to the platforms, front rollers associated with the front ends of the belts, means for intermittently operating the belts and front rollers, sets of rear rollers at the rear of and cooperating with the belts to feed the sheets previously advanced by the belts and the front rollers, means for contacting the rear rollers with the belts when the front rollers and the belts are operated, and means located at the delivery end of the belts to receive the sheets, and for displacing one edge of each of the sheets with respect to the adjacent edge of an adjacent sheet in a plane normal to the sheets and means for moving the sheets in substantially their own plane in a direction normal to the displaced edges for collecting the sheets one over another.

3. A collating machine, comprising platforms, feeding mechanism including a series of intermittently moved belts each arranged in side-by-side relation with the platforms and sets of feed rollers at the front end of the belts and sets of rear rollers at the rear ends of the belts, a tilting frame on which each set of rear rollers are mounted, a wire resting on each belt between the front and rear sets of rollers to hold the paper sheets on the belts while in transit over the belts and platforms, means for elevating the rear sets of rollers when the advanced ends of the sheets have passed under the forward rollers of said rear sets of rollers, means at the time the rear rollers are elevated and out of contact with the paper sheets for stopping the movement of the belts and the front rollers, and means located at the delivery end of the feeding mechanism to receive the sheets, and for displacing one edge of each of the sheets with respect to the adjacent edge of an adjacent sheet in a plane normal to the sheets and means for moving the sheets in substantially their own plane in a direction normal to the displaced edges for collecting the sheets one over another.

4. A collating machine, comprising feeding mechanism including a series of belts having intake and discharge ends and front rollers disposed at said intake ends, sets of rear rollers at the discharge ends of the belts, tilting supports for the rear sets of rollers, including arms and rocking members, a series of overlapping tables located at said discharge ends to receive sheets delivered thereto by the belts and the rear rollers, means for tilting the rear sets of rollers, means for stopping movement of the belts at the time the rear sets of rollers are moved out of contact with the belts, and means disposed adjacent to said overlapping tables for collecting and ejecting the accumulated sheets delivered by the feeding means when movement of the belts ceases.

5. A collating machine, comprising a series of stack-loading tables, means for automatically elevating the tables as sheets are fed from the stacks thereon, sheet feeding means including belts and rollers for feeding sheets from the stacks on the tables, suction means for picking up the top sheets and delivering same to the feeding means, means for first lowering the suction means to engage the sheets of paper and thereafter elevating and advancing same to the feeding means, means for operating the feeding means when the sheets are introduced to same by the suction means, sets of rear rollers at the rear of and cooperating with the belts and spaced from the front rollers to contact the sheets prior to the rear end of the sheet being free of the front rollers and remove said rear rollers from contact with the sheets after the rear ends of the sheets are free of contact with the front rollers, and means located at the delivery end of said feeding means to receive the sheets and for displacing one edge of each of the sheets with respect to the adjacent edge of an adjacent sheet in a plane normal to the sheets and means for moving the sheets in substantially their own plane in a direction normal to the displaced edges for collecting the sheets one over another.

6. A collating machine, comprising intermittently operated sheet-feeding means, a series of sheet-collecting tables to receive the sheets from the feeding means, a carriage carrying gathering fingers, means for raising the gathering fingers above the level of the sheets in position to eject the sheets from the collecting tables when moved in one direction and for lowering the fingers below the level of the sheets when moved in the opposite direction, and mechanism for intermittently operating the carriage when the feeding means is stopped.

7. A collating machine, comprising intermittently operated feeding means, a series of sheet-collecting tables at the delivery end of the feeding means and, having their forward ends overlapping the ends of adjacent tables, a carriage movable parallel to the sheet collecting tables and at right angles to the movement of the feeding means and carrying gathering fingers, means for elevating the fingers above the level of the sheets in position to eject the sheets from the sheet-collecting tables when moved in one direction and for lowering the fingers below the level of the sheets when moved in the opposite direction, means for operating the carriage, and means for moving the assembled and ejected sheets in a pile after delivery from the collecting tables.

8. A collating machine, comprising a series of sheet-feeding means to introduce sheets to a series of collecting tables arranged at right angles to the series of sheet-feeding means and disposed at the delivery end of the feeding means, a cover over the collecting tables spaced to form a passageway for the sheets fed thereto by the sheet-feeding means, gathering fingers movable above the level of the sheets for ejecting the sheets one over the other from the collecting tables when moved in one direction and movable below the level of the sheets when moved in the opposite direction, means for operating the gathering fingers, and means for adjusting the operating means to determine the throw of the gathering fingers according to the number of feeding means and collecting tables employed.

9. A collating machine, comprising a series of sheet-feeding means to introduce sheets of paper to a series of collecting tables arranged at right angles to the series of sheet-feeding means and disposed at the delivery end of the feeding means, a cover for the tables spaced to permit introduction of the sheets of paper from the sheet-feeding means, gathering elements having fingers movable above the level of the sheets for ejecting the sheets from the tables one over the other when moved in one direction and lowering the fingers below the level of the sheets when moved in the opposite direction, means for operating the gathering elements, and means including pushers for removing a predetermined number of groups of sheets in a pile when ejected from the collecting tables, and means for operating the last mentioned means.

10. In a collating machine, a series of sheet-feeding means including sets of rollers and feed belts, a series of collecting tables, one of said tables being located at the delivery end of each sheet-feeding means, each of the series of feeding means being parallel to the other, a series of stops associated with the collecting tables to stop the sheets issuing from the feeding means, means for collecting and ejecting sheets from the collecting tables, means operatively connected with said collecting and ejecting means for raising the stops when ejecting the sheets from the tables, and means operated simultaneously with the last mentioned means for raising the sets of rollers.

11. A collating machine, comprising a plurality of inclined spaced-apart collecting tables, one end of each table overlapping the next adjacent table, a pair of bars disposed below the tables, a carriage reciprocally mounted on the bars, reciprocal sheet-removing fingers carried by the carriage to remove sheets delivered to the tables, brake shoes interposed between the carriage and the bars, means for increasing or decreasing the friction of the brake shoes on the bars, means for reciprocating the carriage, means associated with the reciprocating means to elevate the fingers to collect sheets on the tables and withdraw said fingers from sheet-collecting position when the carriage is reversed, feed means arranged to deliver sheets to said tables, said feed means including a plurality of conveyors on opposite sides of which are platforms inclined downwardly toward said conveyors, and means for actuating said conveyors.

12. A collating machine, comprising a front and rear part feeding means, including a belt, the front part comprising contacting rollers each side the forward end of the belt, and means for intermittently stopping and moving the belt, the rear part being spaced from the front part and co-operating with the belt and comprising a tilting frame carrying a first and a second set of rollers to engage the belt, and means responsive in timed relationship with the movement of the belt to tilt the frame to contact the rollers with the belt when movement of the belt starts and to raise the rollers when the movement of the belt is stopped, the distance between said contacting rollers and said first set of frame carried rollers being smaller than the length of the sheet being fed to insure the advanced end of the sheet being in the bite between the first set of frame carried rollers and the belt after the rear end of the sheet is released from the rollers of the front part.

13. The combination of claim 11 and means disposed above said conveyors and said platforms for retaining the sheets in a predetermined path of travel on said platforms and said conveyors.

14. The combination of claim 13 wherein said retaining means comprises strips spaced above said platforms, and elongated members resting upon said conveyors.

WALTER H. SMITH.

REFERENCES CITED

The following references are of record in the file of this patent:

UNITED STATES PATENTS

| Number | Name | Date |
| --- | --- | --- |
| 1,453,019 | Molins | Apr. 24, 1923 |
| 1,861,406 | Cook | May 31, 1932 |
| 1,865,750 | Elwell | July 5, 1932 |
| 2,144,821 | Twomley | Jan. 24, 1939 |
| 2,167,470 | West | July 25, 1939 |
| 2,178,783 | Egger | Nov. 7, 1939 |
| 2,284,430 | Jirousek | May 26, 1942 |
| 2,295,073 | Blythe et al. | Sept. 8, 1942 |
| 2,300,657 | Dudley | Nov. 3, 1942 |
| 2,308,804 | Dager | Jan. 19, 1943 |
| 2,373,746 | Dager | Apr. 17, 1945 |
| 2,389,066 | Leifer | Nov. 13, 1945 |
| 2,479,060 | Davidson | Aug. 16, 1949 |